May 13, 1958     J. W. CARTER ET AL     2,834,225
CORK FACED VIBRATION DAMPER
Filed Dec. 8, 1954
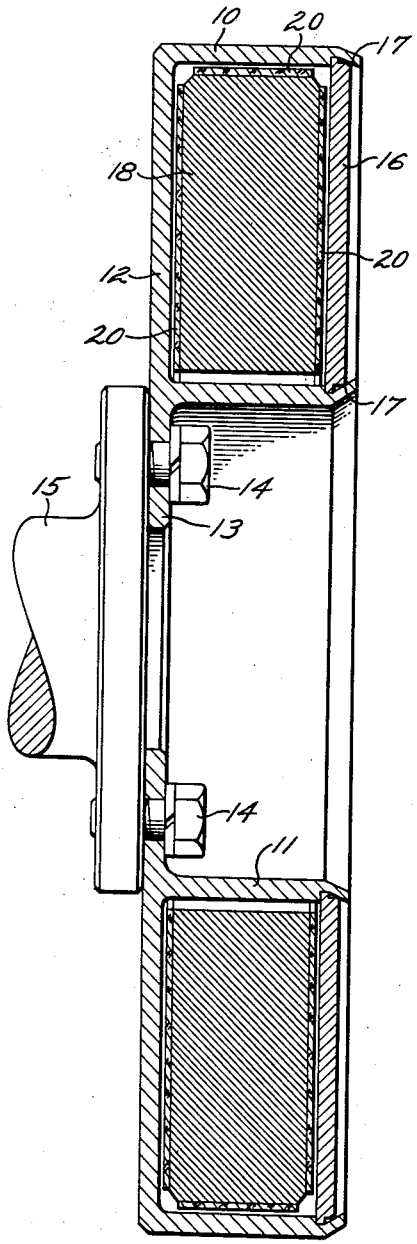
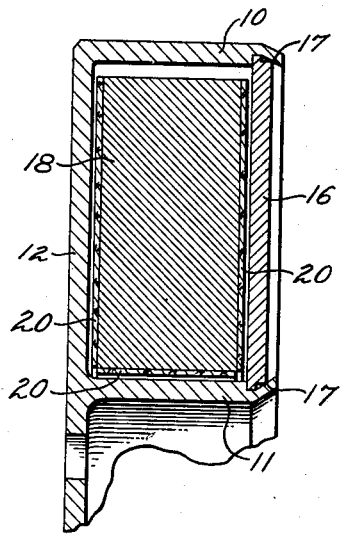
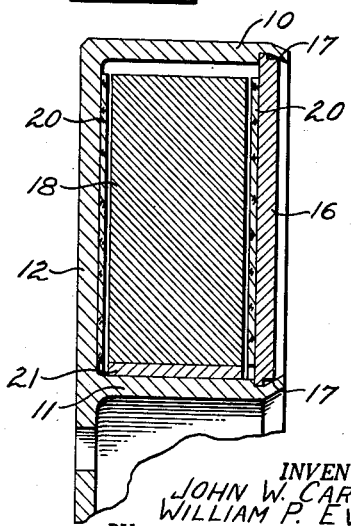
INVENTORS
JOHN W. CARTER
WILLIAM P. EVANS
BY
ATTORNEYS

United States Patent Office 2,834,225
Patented May 13, 1958

2,834,225

CORK FACED VIBRATION DAMPER

John W. Carter and William P. Evans, Peoria, Ill., assignors to Caterpillar Tractor Co., Peoria, Ill., a corporation of California Application December 8, 1954, Serial No. 473,845

6 Claims. (Cl. 74—574)

This invention relates to torsional vibration dampers of the kind employed to damp the vibrations in a rotating mass such for example as the crankshaft of an internal combustion engine.

One type of damper commonly used for this purpose comprises an annular housing adapted to be secured in concentric relation to the crankshaft of an engine and carrying an inertia weight also annular in shape, which weight is free to rotate in the annular chamber provided by the housing but is spaced from the inner housing walls just sufficient to admit a film of viscous fluid which causes a damping of relative motion between the housing and weight resulting from the torsional vibrations in the shaft.

Many failures of this kind of damper have resulted from deterioration of the fluid which appears to be caused by contact between the weight and the interior of the housing. This condition may result from normal operation or from a dent in the housing due to improper handling which causes the inner wall to protrude into contact with the weight. This contact between the weight and the housing produces heat of friction and also sometimes causes particles of metal to be worn from one part or the other so that they are released into the damping fluid. High temperature has a tendency to destroy the fluid and in many cases the entire mass of fluid within the damper has become semi-solid and lost its efficiency to the extent that relative motion can no longer take place between the weight and the casing and the damper cannot perform its intended function. Resulting failures of various engine parts make this an extremely serious problem.

It is the object of the present invention to provide a damper of the kind described in which metal-to-metal contact of relatively moving parts is impossible in order to avoid the destructive results thereof. A further object of the invention is to provide a lining between the casing and the inertia weight of a material that is non-metallic and of a composition sufficiently soft and durable to withstand deformation which may be caused either by dents in the exterior of the casing or by movement of the weight in the contact with the lining within the casing.

Further and more specific objects and advantages of the invention are made apparent in the following specification where reference is made to the accompanying drawings.

In the drawings:

Fig. 1 is a central vertical section through a simple form of torsional vibration damper embodying the present invention;

Fig. 2 is a fragmentary view of a portion of a damper such as that shown in Fig. 1 illustrating a modified form of the present invention; and Fig. 3 is a similar view illustrating a still further modification.

In Fig. 1 of the drawings, the damper is shown as comprising an annular chamber having an outer wall 10 and an inner wall 11. One side wall of the chamber shown at 12 is extended to form a flange 13 by means of which the damper may be secured as by capscrews 14 to the flanged end of a crankshaft a portion of which is illustrated at 15. The opposite sidewall of the chamber illustrated 16 is shown as a separate plate, to facilitate assembly, which is sealed in place as by rolling or forming the edges of the sidewalls 10 and 11 over its edges after the damper is assembled, the resulting closure being shown at 17.

The inertia weight which is illustrated at 18 conforms substantially to the shape of the interior of the casing but is initially fitted therein to permit relative rotation preferably without contact and the small space between the weight and the casing is filled with a viscous substance, silicone being a fluid commonly used for this purpose. The clearance between the outer wall and the sidewalls of the weight and the casing is usually in the order of about 15 thousandths of an inch and, in the present case, the clearance between the inner wall of the weight and the casing is substantially greater to provide a space or reservoir for the damping fluid thus always insuring that there will be ample fluid to fill the smaller spaces, it being understood that the fluid is urged outwardly by centrifugal force in operation. This results in an arrangement where contact is possible between the outer wall of the weight and the housing, particularly when the damper is at rest. While it is intended that during operation the inertia weight be separated from the casing by a film of fluid at all times, there are conditions of operation in which frequent metal-to-metal contact takes place causing heat and frequently causing scuffing of the metal. The present invention eliminates the possibility of any metal-to-metal contact by the provision of a lining material illustrated at 20 in Fig. 1 as secured to the outer wall and to the side walls of the inertia weight. Cork-like material of a thickness of approximately 30 thousandths inch has been found satisfactory for this purpose and it may be secured to the surfaces of the weight with any suitable adhesive that is not affected by the fluid employed for damping. For example, Bakelite cement may be used and the cork may be applied to the surfaces under heat and pressure. Some pressure-sensitive adhesives are being used for this purpose.

The dimensions given above are taken from an actual damper about twelve inches in diameter and may be varied for different types of dampers. For example, greater clearances might be used if the viscosity of the damping fluid increased. The cork-like material employed has been in the nature of those materials known commercially as resin binder cork composition and beater saturated plant fibre cork composition. While a thickness of 30 thousandths of an inch of this material has been used, it is also contemplated that one half this thickness will suffice in some dampers.

Fig. 2 shows a modified form of the invention wherein the weight 18 is piloted or comes to rest on its inner diameter, the larger space being provided adjacent the outer casing wall. Under such conditions, the cork-like material 20 is applied as shown to the inner diameter of the weight rather than to its outer diameter. In some cases, metal bushings have been employed as a pilot to hold the weight against eccentricity even while the damper is not in motion, such a bushing being illustrated at 21 in Fig. 3. In this case, the soft lining is needed only between the sides of the weight and the sides of the casing. Furthermore, as shown in Fig. 3 the lining may be applied to the interior of the casing, rather than to the sides of the weight. It is even possible particularly in dampers of smaller sizes that the lining may be used without securing it to either part as long as it occupies all of the spaces where there is possibility of contact between the weight and the casing walls.

While the cork-like materials referred to have been found satisfactory material for providing linings of the kind described, it is contemplated that other materials may be used instead. It is necessary, however, that the material employed be non-metallic, relatively soft, and sufficiently durable to withstand the rubbing or friction to which it is subjected. Actual tests have shown that such cork-like materials are able to withstand thousands of hours of use without noticeable wear or deterioration. Furthermore, deep dents in the housing which would ordinarily prove destructive to a damper of this type have resulted in only slight deformation of the cork-like lining without resultant high temperature or other ill effects resulting from friction.

The modification illustrated in Fig. 1 where the reservoir for damping fluid is provided to partition the inner diameter of the chamber has the advantage that any particles of cork that may become worn or broken away from the liner will find their way into the reservoir because of the fact that the damping fluid is denser than cork.

One advantage of the invention is that the use of the lining material as described makes it unnecessary to provide a finely machined surface where the cork is applied and also eliminates cadmium plating of the inertia weight which was previously done to inhibit scuffing. Thus the cost of manufacture of the damper is considerably reduced.

We claim:

1. A vibration damper which comprises a casing defining an annular chamber, an annular weight within the chamber and spaced from the inner walls a distance to permit relative rotation of the casing and weight, a lining of non-metallic pliable material in the space to prevent contact between the weight and chamber, and a viscous substance substantially filling the remainder of the space.

2. In a vibration damper of the kind in which an annular metal weight is carried for relative rotation in an annular metal chamber and in which space is provided between the weight and chamber for reception of a damping fluid, the improvement which comprises a lining of a relatively soft non-metallic material disposed between the weight and the chamber in those areas which will prevent contact between them.

3. A torsional vibration damper comprising an inertia weight disposed within a liquid filled housing secured to a rotating mass, a non-metallic resilient material disposed between the surface of the inertia weight and the inner walls of said housing and secured to the surfaces of the inertia weight but free of the walls of the housing.

4. A torsional vibration damper comprising a liquid filled housing secured to a rotating element, an inertia weight disposed within said housing and separated from the inner walls thereof by a layer of non-metallic resilient material secured to the inner walls of the housing but free of the inertia weight.

5. In a torsional vibration damper comprising an annular inertia weight disposed within an annular housing secured to a rotating mass, a viscous substance substantially filling the space between the housing and the inertia weight and a non-metallic resilient material disposed between the surface of the inertia weight and the inner walls of said housing and free of connection with at least one of the weight and housing.

6. A viscous damper of the type employed to soften shock loads in rotating shafts comprising a housing carried by said shaft, an annular enclosed chamber within said housing, a toroidal inertia mass circumferentially movable within said chamber, a viscous fluid filling said chamber, and non-metallic resilient means interposed between the surfaces of said mass, and the inner walls of the chamber and free of connection with at least one of the mass and chamber.

References Cited in the file of this patent
UNITED STATES PATENTS

| 1,271,424 | Brush | July 2, 1918 |
| 1,821,335 | Beal | Sept. 1, 1931 |
| 2,724,983 | O'Connor | Nov. 29, 1955 |

FOREIGN PATENTS

| 496,322 | Canada | Sept. 22, 1953 |
| 892,592 | France | Jan. 10, 1944 |